United States Patent
Din et al.

(10) Patent No.: US 9,895,872 B2
(45) Date of Patent: Feb. 20, 2018

(54) THREE-DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Shih-Jer Din, New Taipei (TW); Jui-Feng Chang, New Taipei (TW); Shy-Huey Yee, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 681 days.

(21) Appl. No.: 14/449,145

(22) Filed: Jul. 31, 2014

(65) Prior Publication Data

US 2016/0031160 A1 Feb. 4, 2016

(51) Int. Cl.
  *B29C 67/00* (2017.01)
  *B33Y 30/00* (2015.01)
  (Continued)

(52) U.S. Cl.
  CPC ............ *B33Y 30/00* (2014.12); *B29C 64/106* (2017.08); *B29C 64/245* (2017.08); *B29C 64/40* (2017.08); *B33Y 40/00* (2014.12)

(58) Field of Classification Search
  CPC ............ B29C 67/0092; B29C 67/0055; B29C 67/0085; B29C 64/20; B29C 64/30;
  (Continued)

(56) References Cited

U.S. PATENT DOCUMENTS 6,096,166 A  8/2000 Liou
2010/0173096 A1*  7/2010 Kritchman .......... B29C 67/0059
                                                                427/553
(Continued)

FOREIGN PATENT DOCUMENTS

CN  102211330  10/2011
CN  103552243  2/2014
(Continued)

OTHER PUBLICATIONS

"Office Action of Taiwan Counterpart Application", dated Apr. 26, 2016, p. 1-p. 7.
(Continued)

*Primary Examiner* — Yogendra N Gupta
*Assistant Examiner* — Emmanuel S Luk
(74) *Attorney, Agent, or Firm* — JCIPRNET

(57) ABSTRACT

A 3-D printing apparatus includes a base and a printing head disposed above the base. The base includes an adjustment platform having an adjustment side and a top surface, a first-adjustment mechanism, second-adjustment mechanisms and a printing bed. The first-adjustment mechanism includes an adjustment shaft, first and second gears and a linkage rod. The first gear disposed under the adjustment platform is engaged with the adjustment shaft to drive it to move along a normal direction of the top surface. The second gear is engaged with the first gear to drive it to rotate. The linkage rod extended to the adjustment side connects the second gear to drive it to rotate. The second-adjustment mechanisms arranged along the adjustment side are adapted to move along the normal direction. The printing bed disposed on the adjustment platform is engaged with the adjustment shaft and the second adjustment mechanisms to move therewith.

10 Claims, 3 Drawing Sheets

(51) Int. Cl.
*B33Y 40/00* (2015.01)
*B29C 64/106* (2017.01)
*B29C 64/40* (2017.01)
*B29C 64/245* (2017.01)

(58) Field of Classification Search
CPC ..... B29C 64/106; B29C 64/245; F16M 11/04; F16M 11/125; F16M 11/126; F16M 11/128; F16M 11/2057; F16M 11/2064; F16M 11/2071; F16M 11/22
See application file for complete search history.

(56) References Cited

U.S. PATENT DOCUMENTS

| | | | |
|---|---|---|---|
| 2014/0085620 A1 | 3/2014 | Lobovsky et al. | |
| 2014/0265034 A1* | 9/2014 | Dudley | B29C 67/0085 264/401 |
| 2015/0217519 A1* | 8/2015 | Otten | B29C 67/0085 264/40.1 |
| 2015/0276119 A1* | 10/2015 | Booker | B29C 67/0092 248/561 |
| 2015/0321419 A1* | 11/2015 | Linthicum | B29C 47/0002 264/308 |
| 2015/0367580 A1* | 12/2015 | Touma | B29C 67/0055 700/98 |
| 2016/0052207 A1* | 2/2016 | Bloom | B29C 67/0085 425/3 |
| 2016/0082670 A1* | 3/2016 | Paroda | B29C 67/0092 425/375 |
| 2016/0136902 A1* | 5/2016 | Stadlmann | B29C 67/0088 425/174.4 |
| 2016/0207260 A1* | 7/2016 | Lee | B29C 67/0085 |

FOREIGN PATENT DOCUMENTS

| | | |
|---|---|---|
| CN | 203418764 | 2/2014 |
| CN | 203472159 | 3/2014 |
| CN | 103862298 | 6/2014 |
| GB | 755893 | 8/1956 |
| TW | M473297 | 3/2014 |
| TW | M477638 | 5/2014 |
| TW | M480439 | 6/2014 |

OTHER PUBLICATIONS

"Office Action of China Counterpart Application", dated Feb. 27, 2017, p. 1-p. 7.

* cited by examiner

THREE-DIMENSIONAL PRINTING APPARATUS

BACKGROUND OF THE INVENTION

Field of the Invention

The present invention generally relates to a printing apparatus. More particularly, the present invention relates to a three-dimensional (3-D) printing apparatus.

Description of Related Art

With the advance in computer-aided manufacturing (CAM), the manufacturing industry has developed a three-dimensional (3-D) printing technology to rapidly convert original design concept into physical objects. The 3-D printing technology is actually a general designation of a series of rapid prototyping (RP) techniques. A basic principle thereof is an additive manufacturing by using a RP machine to form a sectional shape of a workpiece in an X-Y plane through scanning, and to intermittently shift by a layer thickness along a Z-axis, so as to finally form a 3-D object. The 3-D printing technology is not limited to any geometric shape, and the more complex the components are, the more excellent the RP technology is demonstrated. The 3-D printing technology may greatly save manpower and processing time. With a demand of shortest time, a digital 3-D model designed by using a 3-D computer-aided design (CAD) software may be truthfully presented as touchable. Furthermore, a geometric curve of the digital 3-D model could be truthfully appreciated. Moreover, assembly ability of components thereof may be tested and even functions thereof may possibly be tested.

In general, a current 3-D printer usually reads a digital 3-D model to build a 3-D object accordingly by using the aforesaid RP techniques. However, as time goes by, a base of the 3-D printer configured for carrying the 3-D object may gradually tilted in comparison with a horizontal plane, while coordinates of a digital 3-D model are not modified, such that a printing head of the 3-D printer still prints the 3-D object on the tilted platform according to original plane coordinates of the digital 3-D model. Consequently, a printed 3-D object does not meet actual expectations, and quality and yield of printing of the 3-D printer is adversely affected.

SUMMARY OF THE INVENTION

Accordingly, the disclosure is directed to a three-dimensional (3-D) printing apparatus, wherein the level of the base can be manually adjusted at the same side.

The present invention provides a three-dimensional (3-D) printing apparatus including a base and a printing head. The base includes an adjustment platform, a first adjustment mechanism, a plurality of second adjustment mechanisms and a printing bed. The adjustment platform includes an adjustment side, a top surface and a bottom surface opposite to the top surface. The first adjustment mechanism includes a first adjustment shaft, a first gear, a second gear and a linkage rod. The first adjustment shaft penetrates the adjustment platform and adapted to move along a normal direction of the top surface. The first gear is disposed under the adjustment platform and engaged with the first adjustment shaft to drive the first adjustment shaft to move along the normal direction. The second gear is disposed at the bottom surface and engaged with the first gear to drive the first gear to rotate. The linkage rod is connected to the second gear to drive the second gear to rotate. The linkage rod is parallel to the bottom surface and extended to the adjustment side. The second adjustment mechanisms penetrate the adjustment platform and are arranged along the adjustment side. The first adjustment shaft is non-colinear with the second adjustment mechanisms, and each of the second adjustment mechanisms adapted to move along the normal direction. The printing bed is disposed on the adjustment platform and engaged with the first adjustment shaft and the second adjustment mechanisms to move along the normal direction with the first adjustment shaft and the second adjustment mechanisms. The printing head is disposed above the base for printing a 3-D object on the printing bed.

Based on the abovementioned descriptions, the base of the 3-D printing apparatus utilizes the first adjustment mechanism and the second adjustment mechanisms to adjust the level of the printing bed. Each of the second adjustment mechanisms is disposed at the adjustment side of the adjustment platform and adapted to drive the corresponding part of the printing bed to move along the normal direction of the surface of the adjustment platform. The first adjustment shaft of the first adjustment mechanism is non-colinear with the second adjustment mechanisms, which means the first adjustment shaft is not aligned with the line connected between the second adjustment mechanisms, so as to define a plane with the second adjustment mechanisms. The first adjustment shaft is also adapted to drive a part of the printing bed to move along the normal direction of the surface of the adjustment platform. The link rod of the first adjustment mechanism is extended to the adjustment side to drive the first adjustment shaft. With the disposition, when the printing bed is tilted compared to a horizontal plane, a user can adjust the level of the printing bed at the same side (the adjustment side) of the adjustment platform without having to move to three different locations (three points define a plane) to adjust the level of the printing bed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
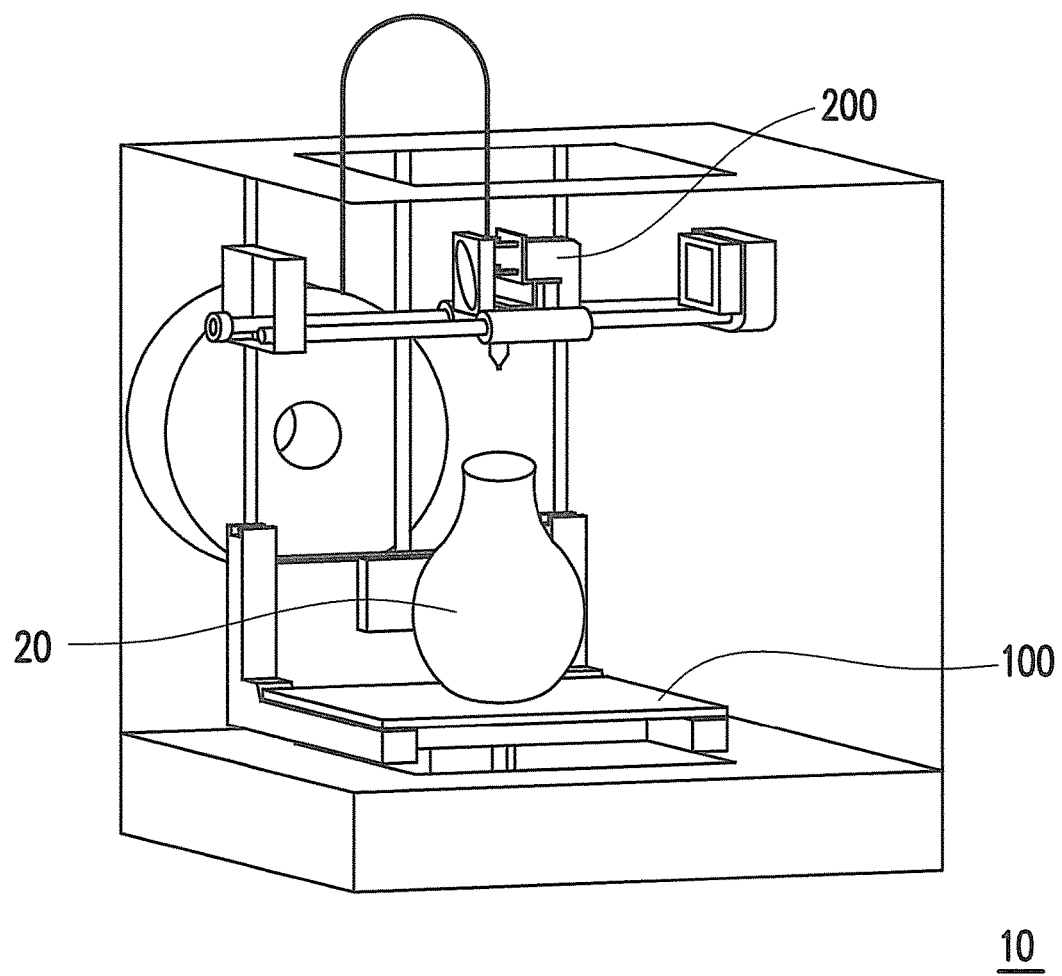
FIG. 1 is a schematic view illustrating a 3-D printing apparatus according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

It is to be understood that the foregoing and other detailed descriptions, features, and advantages are intended to be described more comprehensively by providing each embodiment accompanied with figures hereinafter. In the following embodiments, wordings used to indicate directions, such as "up," "down," "front," "back," "left," and "right", merely refer to directions in the accompanying drawings. Therefore, the directional wording is used to illustrate rather than limit the disclosure. Additionally, same or similar reference numbers used in each of the embodiments represent the same or similar elements.

FIG. 1 is a schematic view illustrating a 3-D printing apparatus according to an exemplary embodiment. Referring to FIG. 1, in the present embodiment, a three-dimensional (3-D) printing apparatus 10 includes a base 100 and a printing head 200, and is suitable for printing a 3-D object 20 according to a digital 3-D model. The digital 3-D model may be a 3-D digital image file, and the 3-D digital image file may be formed by, for example, a computer-aided design (CAD) or a 3-D modeling and animation software. In addition, the digital 3-D model is sliced into a plurality of cross-sectional information for the 3-D printing apparatus 10 to form a plurality of 3-D cross-sectional layers sequentially according to the cross-sectional information of the digital 3-D model. The printing head 200 is disposed above the base 100 to print the 3-D cross-sectional layers sequentially onto the base 100 to form the 3-D object 20.

Figure 2:
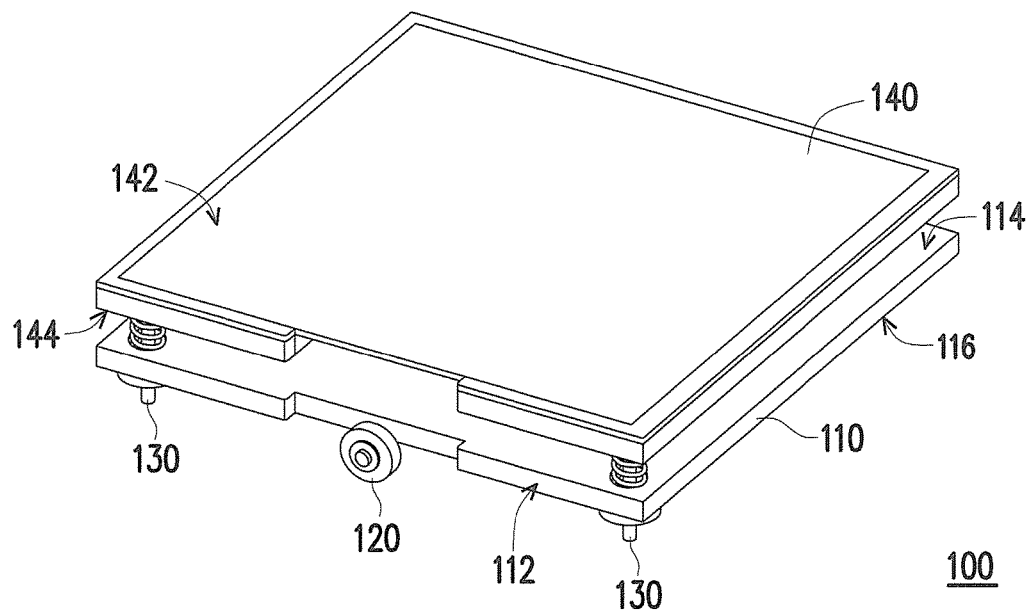
FIG. 2 is a schematic view illustrating a base according to an exemplary embodiment.
Figure 3:
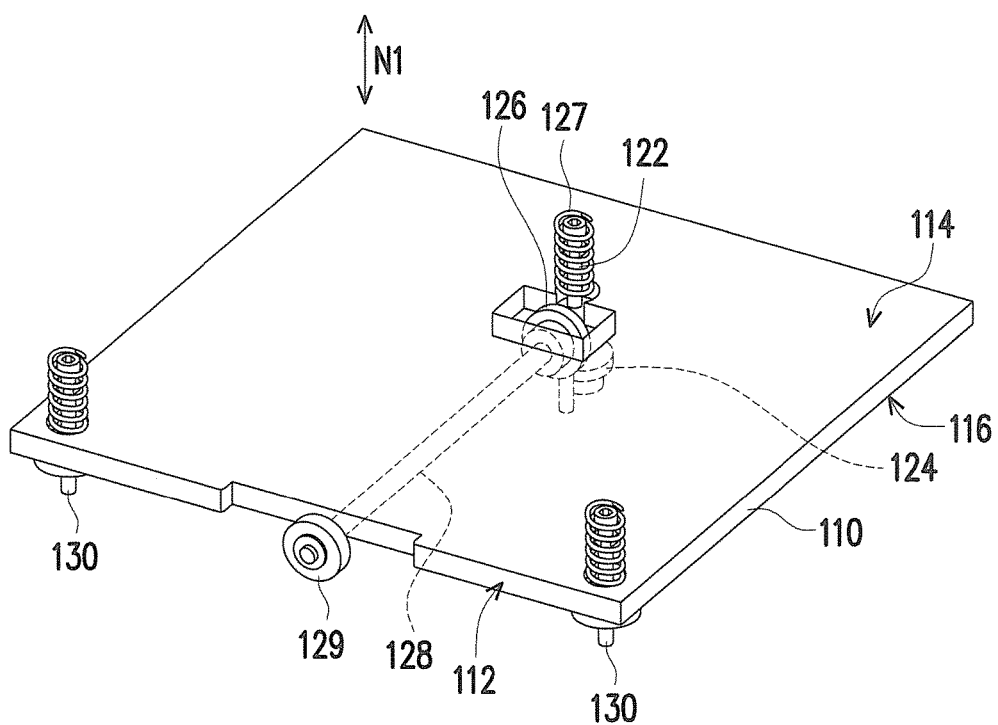
FIG. 3 is a partial view of the base in FIG. 2.

FIG. 2 is a schematic view illustrating a base according to an exemplary embodiment. FIG. 3 is a partial view of the base in FIG. 2. It is noted that, for better illustration of the adjustment platform 110, the printing bed 140 is omitted and the adjustment platform 110 is illustrated in a perspective manner in FIG. 3. Referring to both FIG. 2 and FIG. 3, the base 100 includes an adjustment platform 110, a first adjustment mechanism 120 a plurality of second adjustment mechanisms 130 and a printing bed 140. The adjustment platform 110 includes an adjustment side 112, a top surface 114 and a bottom surface 116 opposite to the top surface 114. The printing bed 140 is disposed on the adjustment platform 110 and includes a carrying surface 142 and a back surface 144 opposite to the carrying surface 142. The carrying surface 142 of the adjustment platform 110 faces the printing head 200 as shown in FIG. 1 for carrying the 3-D object 20. The back surface 144 of the printing bed 140 faces the top surface 114 of the adjustment platform 110 as shown in FIG. 2.

The second adjustment mechanisms 130 are arranged along the adjustment side 112, and each of the second adjustment mechanisms 130 is adapted to move along a normal direction N1 of the top surface 114. It is noted that two second adjustment mechanisms 130 are illustrated in the present embodiment, but the disclosure does not limit the number of the second adjustment mechanisms 130. In the present embodiment, a line connected between the second adjustment mechanisms 130 is parallel to the adjustment side 112 as shown in FIG. 3.

Figure 4:
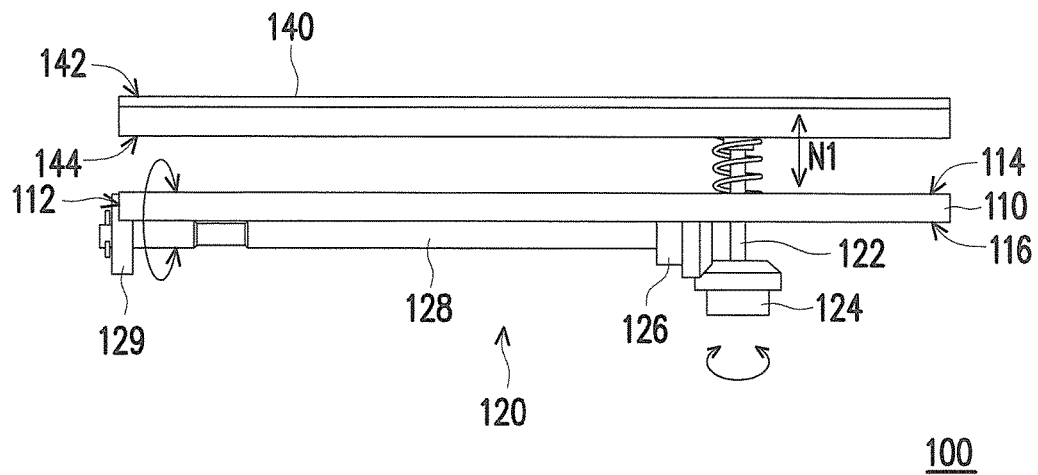
FIG. 4 is a side view of the base in FIG. 2.

FIG. 4 is a side view of the base in FIG. 2. Referring to both FIG. 3 and FIG. 4, the first adjustment mechanism 120 includes a first adjustment shaft 122, a first gear 124, a second gear 126, a linkage rod 128 and a first adjustment handle 129. The first adjustment shaft 122 penetrates the adjustment platform 110 and is adapted to move along the normal direction N1 of the top surface 114. In detail, the first adjustment mechanism 120 further includes a first elastic component 127, sleeved on the first adjustment shaft 122 and leaned between the adjustment platform 110 and the printing bed 140 to function as a cushion between the adjustment platform 110 and the printing bed 140. The first gear 124 is disposed under the adjustment platform 110 as shown in FIG. 4 and is engaged with the first adjustment shaft 122 to drive the first adjustment shaft 122 to move along the normal direction N1. To be more specific, the first adjustment shaft 122 is, for example, a screw, and the first gear 124 includes a threaded hole as shown in FIG. 4, so as to be engaged with the screw. As such, when the first gear 124 rotates, the first adjustment shaft 122 is driven to move along the normal direction N1 due to the engagement of the screw and the threaded hole.

In addition, the second gear 126 is rotatably disposed at the bottom surface 116 and is engaged with the first gear 124 to drive the first gear 124 to rotate. To be more specific, the second gear 126 is engaged with an outer surface of the first gear 124, so when the second gear 126 rotates, the second gear 126 drives the first gear 124 to rotate. The linkage rod 128 is connected to the second gear 126 to drive the second gear 126 to rotate. The linkage rod 128 is parallel to the bottom surface 116 as shown in FIG. 4 and extended to the adjustment side 112. The first adjustment handle 129 rotatably disposed at the bottom surface 116 and is located at the adjustment side 112 to be connected to the linkage rod 128, so as to drive the linkage rod 128 to rotate. Namely, the linkage rod 128 is connected between the first adjustment handle 129 and the second gear 126.

With the disposition, when the printing bed 140 is tilted compared to a horizontal plane and a user would like to adjust the level of the printing bed 140, the user may rotate the first adjustment handle 129, so the first adjustment handle 129 drives the linkage rod 128 to rotate, and the linkage rod 128 connected to the second gear 126 to drive the second gear 126 to rotate. Then, the second gear 126 engaged with the first gear 124 drives the first gear 126 to rotate, and when the first gear 124 rotates, the first adjustment shaft 122 is driven to move along the normal direction N1, so as to adjust the level of the part of the printing bed 140 engaged with the first adjustment shaft 122.

The user may also adjust the level of the adjustment side 112 by driving the second adjustment mechanisms 130 located at the adjustment side 112 to move along the normal direction N1. The printing bed 140 is disposed on the adjustment platform 110 and engaged with the first adjustment shaft 122 and the second adjustment mechanisms 130 to move along the normal direction N1 with the first adjustment shaft 122 and the second adjustment mechanisms 130. It is noted that the second adjustment mechanisms 130 and the first adjustment handle 129 are all located at the adjustment side 112, so the user may adjust the movement of the first adjustment shaft 122 and the second adjustment mechanisms 130 at the same side. Moreover, the first adjustment shaft 122 is non-colinear with the second adjustment mechanisms 130, which means the first adjustment shaft 122 is not located at the adjustment side 112, and is not aligned with the line connected between the second adjustment mechanisms 130. In the present embodiment, the first adjustment shaft 122 and the second adjustment mechanisms 130 are arranged in triangular geometry as shown in FIG. 3. Therefore, the first adjustment shaft 122 and the second adjustment mechanisms 130 defines a plane, so the user can adjust the level of the printing bed 140 at the same side (the adjustment side 112) of the adjustment platform 110 by adjusting the height of the first adjustment shaft 122 and the second adjustment mechanisms 130.

Figure 5:
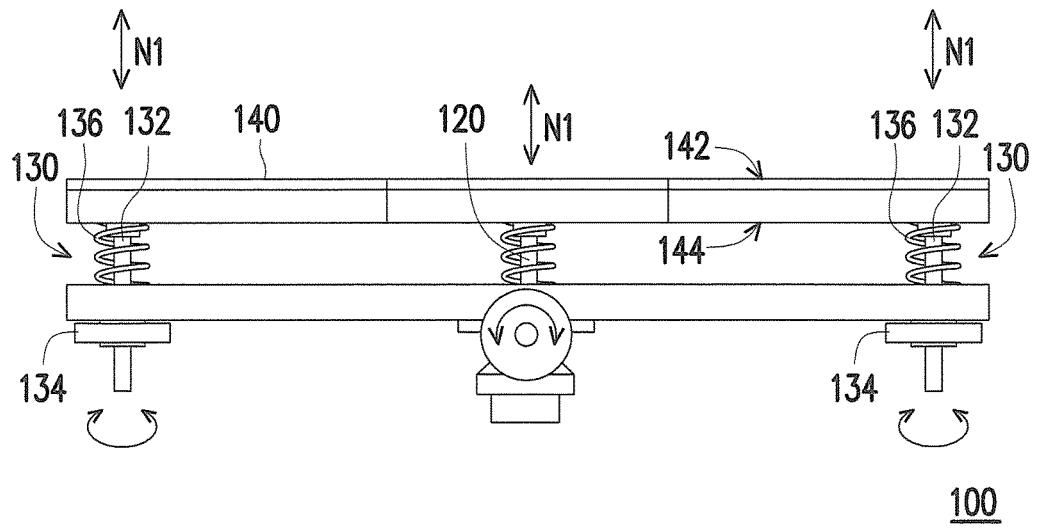
FIG. 5 is another side view of the base in FIG. 2.

FIG. 5 is another side view of the base in FIG. 2. Referring to FIG. 3 and FIG. 5, in detail, each of the second adjustment mechanisms 130 includes a second adjustment shaft 132 and a second adjustment handle 134. Each of the second adjustment shafts 132 is engaged with the back surface 144 of the printing bed 140 to drive the printing bed 140 to move with the second adjustment shafts 132, and each of the second adjustment handles 134 is disposed at the adjustment side 112 and is engaged with the corresponding second adjustment shaft 132 to drive the corresponding second adjustment shaft 132 to move along the normal direction N1. To be more specific, the second adjustment shaft 132 is, for example, a screw, and the second adjustment handle 134 includes a threaded hole to be engaged with the screw. As such, when the user rotates the second adjustment handle 134, the second adjustment shaft 132 is driven to move along the normal direction N1 due to the engagement of the screw and the threaded hole. In the present embodiment, the second adjustment mechanisms 130 further includes a second elastic component 136. The second elastic component 136 is sleeved on the second adjustment shaft 132, which means the second elastic component 136 surrounds the second adjustment shaft 132, and the second elastic component 136 is leaned between the adjustment platform 110 and the printing bed 140 to function as a cushion between the adjustment platform 110 and the printing bed 140.

With the disposition, when the printing bed 140 is tilted compared to a horizontal plane and the user would like to adjust the level of the printing bed 140, the user may rotate the first adjustment handle 129 and the second adjustment handles 134 located at the adjustment side 112 to drive the first adjustment shaft 122 and the second adjustment shafts 132 to move along the normal direction N1, so as to drive the parts of the printing bed 140 engaged with the first adjustment shaft 122 and the second adjustment shafts 132 to move along the normal direction to adjust the level of the printing bed 140. In addition, the first adjustment shaft 122 is non-colinear with the second adjustment shafts 132, and may be arranged in triangular geometry as shown in FIG. 3. Therefore, the first adjustment shaft 122 and the second adjustment shafts 132 defines a plane, so the user can adjust the level of the printing bed 140 at the same side (the adjustment side 112) of the adjustment platform 110 by adjusting the height of the first adjustment shaft 122 and the second adjustment shafts 132.

In sum, in the disclosure, the base of the 3-D printing apparatus adopts the first adjustment mechanism and the second adjustment mechanisms to adjust the level of the printing bed. Each of the second adjustment mechanisms is disposed at the adjustment side of the adjustment platform and adapted to drive the corresponding part of the printing bed to move along the normal direction of the surface of the adjustment platform 1. The first adjustment shaft of the first adjustment mechanism is non-colinear with the second adjustment mechanisms, which means the first adjustment shaft is not aligned with the line connected between the second adjustment mechanisms, so as to define a plane with the second adjustment mechanisms. The first adjustment shaft is also adapted to drive a part of the printing bed to move along the normal direction of the surface of the adjustment platform. The link rod of the first adjustment mechanism is extended to the adjustment side to drive the first adjustment shaft. With the disposition, when the printing bed is tilted compared to a horizontal plane, a user can adjust the level of the printing bed at the same side (the adjustment side) of the adjustment platform without having to move to three different locations (three points define a plane) to adjust the level of the printing bed. Therefore, the 3-D printing apparatus is user-friendly and provides more convenience in operation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A three-dimensional (3-D) printing apparatus, comprising:
   a base, comprising:
      an adjustment platform, comprising an adjustment side, a top surface and a bottom surface opposite to the top surface,
      a first adjustment mechanism, comprising:
         a first adjustment shaft, penetrating the adjustment platform and adapted to move along a normal direction of the top surface;
         a first gear, disposed under the adjustment platform and engaged with the first adjustment shaft to drive the first adjustment shaft to move along the normal direction;
         a second gear, disposed at the bottom surface and engaged with the first gear to drive the first gear to rotate; and
         a linkage rod, connected to the second gear to drive the second gear to rotate, the linkage rod parallel to the bottom surface and extended to the adjustment side;
      a plurality of second adjustment mechanisms, arranged along the adjustment side and adapted to move along the normal direction, the first adjustment shaft being non-colinear with the second adjustment mechanisms; and
      a printing bed, disposed above the adjustment platform and engaged with the first adjustment shaft and the second adjustment mechanisms to move along the normal direction with the first adjustment shaft and the second adjustment mechanisms; and
   a printing head, disposed above the base for printing a 3-D object on the printing bed.

2. The 3-D printing apparatus as claimed in claim 1, wherein the first adjustment mechanism further comprises:
   a first adjustment handle, rotatably disposed at the bottom surface and located at the adjustment side, the first adjustment handle connected to the linkage rod to drive the linkage rod to rotate.

3. The 3-D printing apparatus as claimed in claim 1, wherein the printing bed comprises a carrying surface and a back surface opposite to the carrying surface, the carrying surface faces the printing head for carrying the 3-D object.

4. The 3-D printing apparatus as claimed in claim 1, wherein the first adjustment shaft is a screw, and the first gear comprises a threaded hole to be engaged with the screw.

5. The 3-D printing apparatus as claimed in claim 1, wherein the first adjustment mechanism further comprises:
   a first elastic component, sleeved on the first adjustment shaft and leaned between the adjustment platform and the printing bed.

6. The 3-D printing apparatus as claimed in claim 1, wherein each of the second adjustment mechanisms comprises:
   a second adjustment shaft, engaged with a back surface of the printing bed to drive the printing bed to move with the second adjustment shaft, and the back surface facing the top surface of the adjustment platform; and
   a second adjustment handle, engaged with the second adjustment shaft to drive the second adjustment shaft to move along the normal direction.

7. The 3-D printing apparatus as claimed in claim 6, wherein the second adjustment shaft is a screw, the second adjustment handle comprises a threaded hole to be engaged with the screw.

8. The 3-D printing apparatus as claimed in claim 6, wherein each of the second adjustment mechanisms further comprises:
   a second elastic component, sleeved on the second adjustment shaft and leaned between the adjustment platform and the printing bed.

9. The 3-D printing apparatus as claimed in claim 1, wherein the number of the second adjustment mechanisms is two.

10. The 3-D printing apparatus as claimed in claim 1, wherein the first adjustment shaft and the second adjustment mechanisms are arranged in triangular geometry, and a line connected between the second adjustment mechanisms is parallel to the adjustment side.

* * * * *